(12) United States Patent
Davies

(10) Patent No.: US 6,999,519 B2
(45) Date of Patent: Feb. 14, 2006

(54) MULTICAST RADIO COMMUNICATION SYSTEM AND APPARATUS

(75) Inventor: Robert J. Davies, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 832 days.

(21) Appl. No.: 09/893,044

(22) Filed: Jun. 27, 2001

(65) Prior Publication Data

US 2001/0055356 A1    Dec. 27, 2001

(30) Foreign Application Priority Data

Jun. 27, 2000    (GB) .................................. 0015621

(51) Int. Cl.
*H04L 27/00*    (2006.01)

(52) U.S. Cl. ...................... 375/259; 375/220; 375/356; 370/230; 370/252; 370/432; 714/748; 714/749

(58) Field of Classification Search ................ 375/259, 375/219, 220, 222, 356, 377, 224, 345; 370/276, 370/312, 404, 412, 461–464, 230, 232, 252, 370/254, 352, 338, 401, 474, 432; 455/3.06; 348/14.01, 14.04; 367/117, 198; 709/209; 725/75; 714/748, 749, 751

See application file for complete search history.

(56) References Cited

U.S. PATENT DOCUMENTS

| | | | | |
|---|---|---|---|---|
| 4,584,685 A | * | 4/1986 | Gajjar | 714/751 |
| 5,586,121 A | * | 12/1996 | Moura et al. | 370/404 |
| 5,923,662 A | * | 7/1999 | Stirling et al. | 370/432 |
| 6,021,308 A | * | 2/2000 | Kimura | 725/75 |
| 6,028,866 A | * | 2/2000 | Engel et al. | 370/461 |
| 6,392,993 B1 | * | 5/2002 | Hamilton et al. | 370/230 |
| 6,680,914 B1 | * | 1/2004 | Jung et al. | 370/252 |
| 6,721,306 B1 | * | 4/2004 | Farris et al. | 370/352 |

FOREIGN PATENT DOCUMENTS

| | | |
|---|---|---|
| EP | 0909069 A2 | 4/1999 |
| GB | 2287383 A | 9/1995 |
| WO | WO9805144 | 2/1998 |

OTHER PUBLICATIONS

"Standard Data Procedures"; MPT 1327, UK Radiocommunications Agency, Nov. 1991, chapter 17, pp. 1-55.
"Radio System and Stations for, and Methods of, Multicast Communication", Robert J. Davies, filed May 2, 2001, U.S. Appl. 09/847,216, Pending.
"Radio System and Apparatus for, and Method of, Multicast Communication", Robert J. Davies, filed May 21, 2001, U.S. Appl. No. 09/861,940, Pending.
J. Kuri et al, "Reliabl M<multicast in Mult-Access Wireless LANS", IEEE Infocom 1999, 'Online!, vol. 2, Mar. 1999, pp. 760-767, XP002178197.

* cited by examiner

*Primary Examiner*—Khai Tran
*Assistant Examiner*—Edith Chang

(57) ABSTRACT

A multicast radio data communication system comprising a master and a plurality of slave stations uses a retransmission protocol. Data is transmitted by the master station and received by the slave stations. Slave stations having the weakest radio link are designated primary stations, and all other slaves are designated secondary stations. Any slave station may transmit a negative acknowledgement but only the primary stations may transmit a positive acknowledgement. Positive acknowledgements are transmitted in separate time slots, but negative acknowledgements transmitted by the secondary stations overlap the positive acknowledgements transmitted by primary stations. These negative acknowledgements corrupt reception of the positive acknowledgement by the master station, thereby ensuring that the data is retransmitted.

4 Claims, 3 Drawing Sheets

MULTICAST RADIO COMMUNICATION SYSTEM AND APPARATUS

Figure 1:
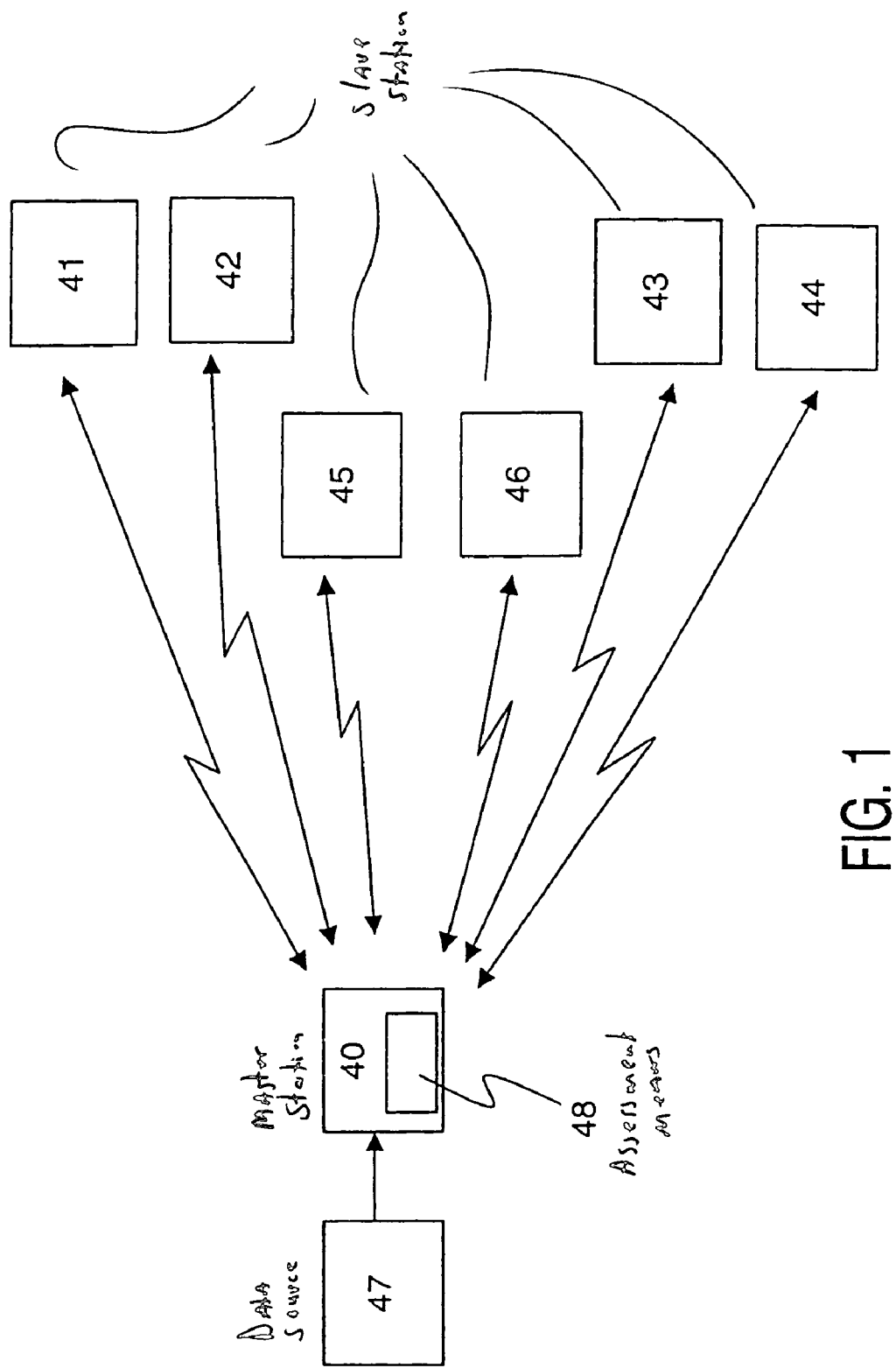

The present invention relates to a radio system for multicast data communication, and master and slave stations for use in a multicast radio network, and has particular, but not exclusive, application to the distribution of audiovisual data streams.

In point-to-point communication of digital information over a radio link it is common practice to divide the digital information into data packets and to employ error protection in the form of a retransmission protocol in which the receiving device transmits an acknowledgement for each data packet received. If a data packet is received correctly the acknowledgement is a positive acknowledgement (ACK), in which case the sending device proceeds to send the next data packet. If the data packet is received corrupted by errors the acknowledgement is a negative acknowledgement (NACK), in which case the sending device normally retransmits the data packet.

In multicast radio communication there is a single radio station, commonly referred to as a master station, sending data to more than one receiving station, commonly referred to as slave stations. There are three basic alternative methods of operating such communication.

First, the digital information is broadcast to all slaves simultaneously, and no acknowledgements are transmitted by the slaves. The disadvantage of this is that retransmissions cannot be requested when data packets are corrupted. This method is defined, for example, in the group data call facility of MPT1327 specification published by the UK Radiocommunications Agency, November 1991, chapter 17.

Second, the digital information is transmitted to each slave in turn, and each slave acknowledges receipt in turn. This method of operation is as a set of point-to-point communication links. The disadvantage of this is the cumulative time taken to serve all slaves, or the increased spectrum requirement if the data transmission rate is increased to offset the delay or if each link operates on a different frequency.

Third, the digital information is broadcast to all slaves simultaneously, and then each slave is interrogated in turn to determine whether the information has been received. The disadvantage of this is the cumulative time taken to interrogate all slaves. This method is also defined in the group data call facility of MPT1327 specification published by the UK Radiocommunications Agency, November 1991, chapter 17.

Time delay is a problem especially for time critical data such as audiovisual stream information. An example of an application of multicast radio communication for the transmission of an audiovisual data stream is wireless loudspeakers. Wireless loudspeakers are desirable as a way to reduce cable installation. There is a requirement for different loudspeakers to receive different information, for example the left and right audio channels of a stereo pair, or several channels in a surround sound application.

The radio link from the master station to each wireless loudspeaker can be operated simultaneously as a set of point-to-point links. The disadvantage of this is that the master requires more bandwidth than a point-to-point link, and may require multiple radio transceivers. Furthermore, the different audio channels are typically available prior to transmission over the radio link as a single multichannel mix incorporating audio coding and compression, and sometimes joint coding of channels, as used in the MPEG joint stereo mode. It is desirable to transmit the different channels as a single stream multichannel mix in order to avoid the complexity of separating the different channels prior to transmission and to avoid the requirement to synchronise such separated channels received by different receiving devices.

One solution for multicast data communication is disclosed in UK patent application 0012410.7 in which each slave station has an exclusive time period in which to acknowledge receipt of a data packet. However, in that solution, the maximum number of slaves is limited by the time available for acknowledgements.

An object of the invention is to provide improvements in multicast radio communication.

According to one aspect of the invention there is provided a multicast radio system comprising a master station and a plurality of slave stations, the master station comprising means to transmit data to the plurality of slave stations simultaneously, each slave station comprising means to receive the data and means for determining whether it requires retransmission of the data, wherein at least one slave station is in a first state and the other slave station or slave stations is or are in a second state, wherein the or each slave station in the first state, if retransmission is not required, transmits a positive acknowledgement in a predetermined time slot which is substantially non-overlapping with any positive acknowledgement transmitted by any other slave station in the first state, wherein the or each slave station in the second state does not transmit an acknowledgement if retransmission is not required and transmits a negative acknowledgement if retransmission is required, wherein at least one negative acknowledgement transmitted by at least one slave station in the second state is transmitted at least partially concurrently with the or at least one said predetermined time slot, and wherein the master station retransmits the data if it does not receive the positive acknowledgement from the or each of the slave stations in the first state or if it receives at least one negative acknowledgement, and if the validity of the data has not expired.

The multicast radio system in accordance with the present invention enables more slave stations to be operational in a network than the number of time slots available for individual acknowledgements, by permitting some slave stations to refrain from transmitting positive acknowledgements, while enabling the number of slave stations providing positive confirmation of receipt of a data packet to be maximised.

Data packets are transmitted by the master station and received by the slave stations. The slave stations are equipped to transmit a positive acknowledgement, if not refrained from doing so, and a negative acknowledgement, according to whether the data packet is decodeable or undecodeable respectively. The definition of decodeable is system dependent, but may include, for example, the case where the data is received error free, the case where errors occur but are corrected by means of check bits, and the case where errors cannot be corrected but the errors are nevertheless deemed acceptable. Conversely, the data may be deemed undecodeable in the case where errors cannot be corrected and cause an unacceptable degradation in the data.

A retransmission protocol using the acknowledgements operates as follows. After the transmission of a data packet there is a period of time available for slave stations to transmit acknowledgements, and this period comprises one or more time slots. One or more of the slave stations are designated primary stations and the or each primary station transmits a positive acknowledgement if no retransmission is required. In the or each time slot, only one primary station may transmit a positive acknowledgement, so the maximum number of primary stations is equal to the number of time slots. The remainder of the slave stations are designated secondary stations, and these do not transmit a positive acknowledgement.

The primary and secondary stations both transmit negative acknowledgements. A negative acknowledgement transmitted by a secondary station overlaps in time, at least partially, one or more acknowledgements transmitted by the one or more primary stations.

If the master station receives a positive acknowledgement from each primary station, and receives no negative acknowledgement, it will proceed to transmit the next data packet. If the master station receives a negative acknowledgement from any slave station, or fails to receive a positive acknowledgement from the or each primary station, and unless the previously transmitted data is no longer valid, the master station will retransmit the data packet.

By means of the above retransmission protocol, more slave stations may be operational in the network than the number of time slots available for the transmission of acknowledgements, and the number of slave stations providing positive confirmation of receipt of a data packet may be maximised.

The transmission of a negative acknowledgement by a secondary station overlapping another acknowledgement may cause corruption, or may be corrupted, preventing successful reception by the master station, but this corruption results in the master station retransmitting the previously transmitted data packet, which is the same outcome as if the negative acknowledgement had been received.

The designation of each slave station as either primary or secondary may be made under command of the master station, which provides flexibility and avoids user involvement. Furthermore, the primary stations may be those slave stations having the lowest quality radio communication with the master station, on the basis of a quality assessment made by the master station. If desired, a slave station may adjust its transmitted power level under the command of the master station to ensure differentials in communication quality. This helps to ensure that a positive acknowledgement does not mask a negative acknowledgement transmitted by a secondary station, and conversely helps to ensure a negative acknowledgement corrupts at least one of any positive acknowledgements.

The time slot for transmitting a positive acknowledgement may be assigned to a primary station by the master, to ensure that positive acknowledgements are transmitted at non-overlapping times. Also, the time for transmitting a negative acknowledgement may be assigned to a secondary station by the master, to ensure that the negative acknowledgement overlaps in time a positive acknowledgement transmitted by a primary station.

In embodiments where the data being transmitted is time critical, such that excessive delay may render the data useless to the receiving application, retransmission of data is suppressed if the validity of the data has expired.

According to a second aspect of the invention there is provided a master radio station for use in a multicast radio network comprising a master station and a plurality of slave stations, the master station comprising means to command at least one of the slave stations of the plurality to adopt a first state wherein the slave station transmits a positive acknowledgement in response to receiving data that it does not need to have retransmitted, means to command at least one other of the slave stations of the plurality to adopt a second state wherein the slave station does not transmit an acknowledgement in response to receiving data that it does not need to have retransmitted and transmits a negative acknowledgement in response to receiving data which it needs to have retransmitted, means to instruct the or each slave station in the first state of a time slot in which to transmit the positive acknowledgement such that positive acknowledgements transmitted by more than one slave station are transmitted at substantially non-overlapping times, means to transmit data to the plurality of slave stations simultaneously, means to receive acknowledgements from the plurality of slave stations, and means to retransmit the data if the positive acknowledgement is not received from each of the slave stations in the first state or if at least one negative acknowledgement is received, and if the validity of the data has not expired.

According to a third aspect of the invention there is provided a slave radio station for use in a multicast radio network comprising a master station and a plurality of slave stations, the slave station comprising means for setting the slave station into a first state and into a second state, means for receiving data from the master station, means for determining whether the slave station requires retransmission of the data, wherein in the first state, if it does not require retransmission of the data, the slave station transmits a positive acknowledgement in a predetermined time slot which is substantially non-overlapping with any positive acknowledgement transmitted by any other slave station in the first state, and wherein in the second state the slave station does not transmit a positive acknowledgement and transmits a negative acknowledgement if it requires retransmission of the data, the negative acknowledgement being transmitted at least partially concurrently with at least one time slot predetermined for the transmission of a positive acknowledgement.

If desired, a master station or a slave station may be implemented in an integrated circuit.

Figure 2:
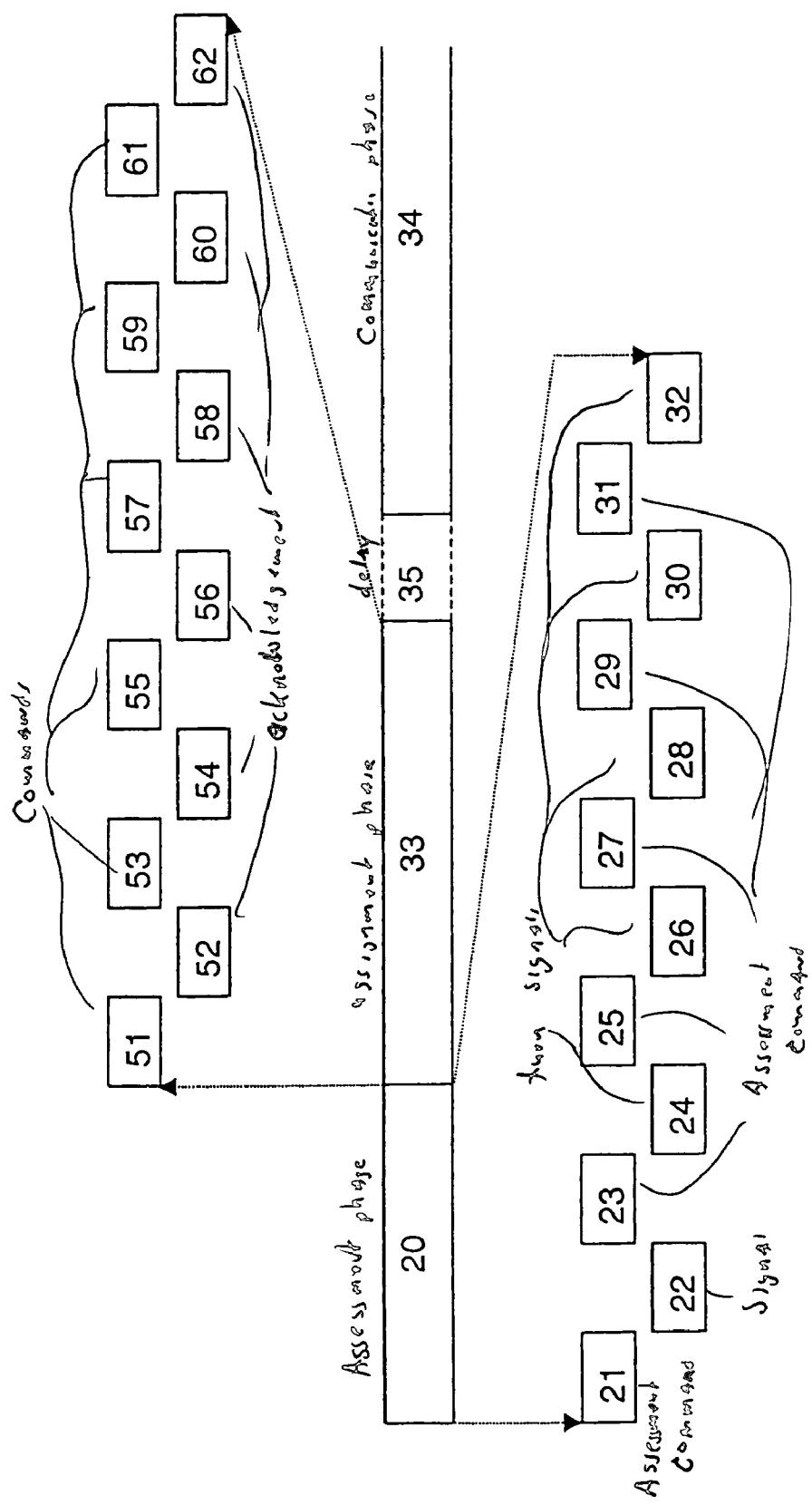
Figure 3:
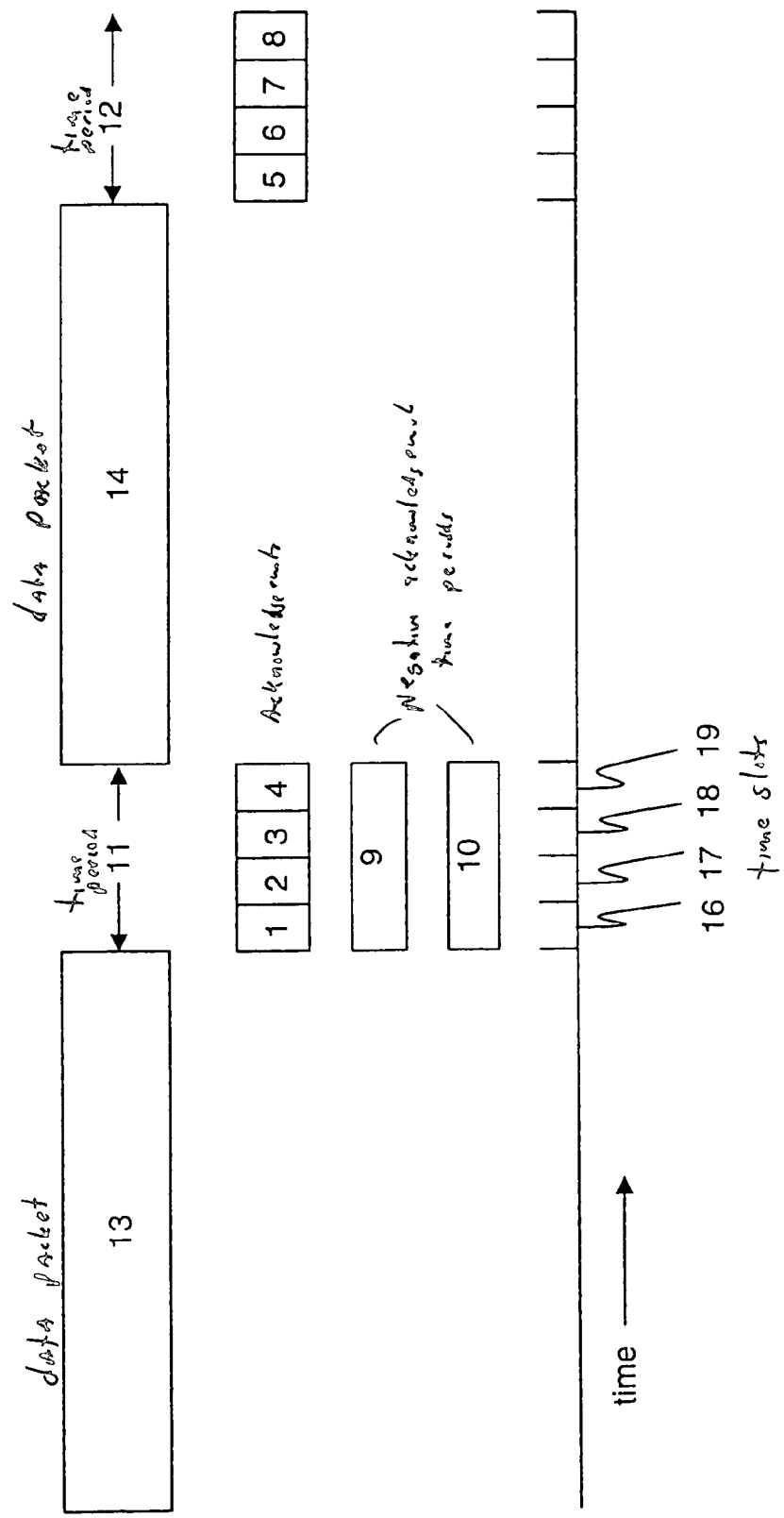

The invention will now be described, by way of example, with reference to the accompanying drawings, wherein;

FIG. 1 is a block diagram of a system comprising a master station and six slave stations, FIG. 2 is a diagram illustrating the phases of operation of the system, and FIG. 3 is a diagram illustrating the flow of messages during a data communication phase.

FIG. 1 shows a wireless network comprising a master station 40, for example a set top box, and first, second, third, fourth, fifth and sixth slave stations 41, 42, 43, 44, 45 and 46, for example wireless loudspeakers. The master station 40 receives an isochronous digital audio data stream from a data source 47 for distribution to the slave stations 41, 42, 43, 44, 45 and 46. The digital audio data stream may be, for example, a multichannel surround sound mix of different audio for each wireless loudspeaker.

Referring to FIG. 2, there is an assessment phase 20. During the assessment phase the master station 40 assesses the quality of the radio link with each slave station 41, 42, 43, 44, 45 and 46 in the wireless network. The master station 40 does this by transmitting an assessment command 21 to the first slave station 41 instructing the first slave station to transmit a signal 22, followed by transmitting in turn assessment commands 23, 25, 27, 29 and 31 to the other five slave stations 42, 43, 44, 45 and 46 instructing the other slave stations to transmit in turn signals 24, 26, 28, 30 and 32. The master station receives each of the six signals 22, 24, 26, 28, 30 and 32 and, by means of signal level measurement and assessment means 48 (shown in FIG. 1), measures the received level of the respective signals, and assesses which signals have the lowest level and therefore provide the lowest quality radio communication. Alternatively, other known measures of communication quality may be used.

The time period 11, 12 (shown in FIG. 3, described below) available for the slave stations to transmit acknowledgements on receipt of a data packet is, in this example, sufficient to accommodate four consecutive acknowledgements, so the master station 40 selects the four slave stations having the lowest quality communication to be primary slave stations. In the present example the slave stations 41, 42, 43 and 44 are selected to be the primary slave stations. The other slave stations 45 and 46 are selected to be secondary slave stations.

Following the assessment phase there is an assignment phase 33 during which the master station 40 instructs each slave station 41, 42, 43, 44, 45 and 46 to adopt the state of either a primary or secondary slave station, as selected during the assessment phase, by transmitting respective assignment commands 51, 53, 55, 57, 59 and 61. Each slave station 41, 42, 43, 44, 45 and 46 transmits an acknowledgement 52, 54, 56, 58, 60 and 62 respectively in response to their assignment command. The difference between a primary slave station and a secondary slave station is that only a primary slave station can transmit a positive acknowledgement in response to receiving a decodeable data packet, whereas both primary and secondary slave stations can transmit a negative acknowledgement in response to receiving an undecodeable data packet. In addition to instructing slave stations 41, 42, 43 and 44 to become primary stations, the assignment messages 51, 53, 55, and 57 assign a time slot for transmission of acknowledgements, as described below.

The master station 40 may optionally include within the assignment command which instructs a slave station to become a primary or secondary slave station, or within a separate command, an instruction to adjust the transmitted power level to a specified level, or by a specified amount which may be typically up to 20 dB. The specified adjustment is a compromise as described below.

Following the assignment phase there is a data communication phase 34. This may follow immediately after the assignment phase 33, or there may be a delay 35 if data communication is not required immediately. Further data communication phases may occur at intervals, as determined by communication requirements.

FIG. 3 shows more detail of the data communication phase 34. Data is transmitted in packets, for example two data packets 13 and 14 are illustrated in FIG. 3. After the transmission of data packet 13 there is a period 11 before the next packet transmission for the transmission of acknowledgements by slave stations. The acknowledgement period 11, being in this example sufficient to accommodate four consecutive acknowledgements, is divided into four time slots 16, 17, 18 and 19. The primary stations 41, 42, 43 and 44 transmit their positive or negative acknowledgement 1, 2, 3 and 4 in slots 16, 17, 18 and 19 respectively. Secondary stations 45, 46, which are restricted to transmit only negative acknowledgements, do not need to confine their negative acknowledgement transmissions to the duration of a time slot. Optionally, if the data packet 13 is undecodeable, the secondary stations can transmit negative acknowledgements that substantially occupy the period 11 of all four primary station acknowledgement time slots 16, 17, 18 and 19. In FIG. 3 the potential maximum transmission period for the first secondary station 45 to transmit a negative acknowledgement is referenced 9, and the potential maximum transmission period for the second secondary station 46 to transmit a negative acknowledgement is referenced 10.

If no negative acknowledgement is received by the master station 40, and if all four acknowledgements 1, 2, 3, and 4 transmitted by the primary stations 41, 42, 43, and 44 are positive and received by the master station 40, the next data packet 14 transmitted by the master station 40 is new data. If the master station 40 receives a negative acknowledgement, or if the master station 40 does not receive a positive acknowledgement from each primary station 41, 42, 43, and 44, the next data packet 14 transmitted by the master station 40 is a retransmission of the previously transmitted data packet 13, unless the validity of the data has expired.

Following the transmission of the next data packet 14, there is an acknowledgement period 12 during which the primary stations 41, 42, 43 and 44 transmit acknowledgements 5, 6, 7, and 8 respectively, and during which the secondary stations 45, 46 may transmit negative acknowledgements.

If a primary station receives a duplicate data packet due to retransmission of a packet which it has previously received successfully, the primary station transmits a positive acknowledgement and discards the duplicate data packet.

In one embodiment, a negative acknowledgement transmitted by a secondary station may be a single message overlapping substantially all four primary station acknowledgement time slots 13, 14, 15 and 16, or may comprise concatenated shorter messages extending across the same period. In another embodiment, a negative acknowledgement transmitted by a secondary station may not overlap all primary station acknowledgement time slots 13, 14, 15 and 16.

A negative acknowledgement transmitted by a primary station need not adhere to the same timing as a positive acknowledgement, but may conform to one of the timing options described above for secondary station negative acknowledgements.

Although in the embodiment described the primary stations transmit a negative acknowledgement when a retransmission is required, they may refrain from transmitting any negative acknowledgements as this, also, will result in the master station making a retransmission.

The time of transmission within the acknowledgement period of a negative acknowledgement by a secondary station may be preprogrammed or assigned under command of the master station.

The transmitter power adjustment by a slave station under the command of the master station 40 is a compromise between ensuring that the positive acknowledgement transmitted by a primary slave station is received successfully by the master station 40 when no overlapping negative acknowledgement is transmitted, and ensuring that the positive acknowledgement message transmitted by the primary slave station is not successfully decoded by the master station 40 when an overlapping negative acknowledgement is transmitted.

Although the embodiment has been described in relation to a wireless network comprising six slave stations, four of which can transmit positive acknowledgements within a four time slot period, other numbers of slave stations and slots may be accommodated, depending on the implementation of the multicast system and its operation.

Although the embodiment is described in relation to a wireless network covering a domestic environment with a small number of wireless loudspeakers, the invention is also applicable to a wider area network and a larger number of slave stations, for example a city wide, or larger, system.

Although the invention has been described in relation to a system for transmitting stream data, it can be applied to non-stream data.

In the present specification and claims, a reference to a master station or to a slave station does not preclude a station with dual functionality that can function as either a master or slave, according to the prevailing communication requirement. Furthermore, in the present specification and claims a radio station supports radio communication functionality and may also include functionality relating to the apparatus that the data is communicated to or from. An example of a master radio station is a domestic compact disc player comprising radio functionality and also functionality for playing a compact disc. An example of a slave radio station is a wireless loudspeaker comprising radio functionality and also including a loudspeaker.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of multicast radio communication and which may be used instead of or in addition to features already described herein.

I claim:

1. A multicast radio system comprising a master station and a plurality of slave stations, the master station comprising means to transmit data to the plurality of slave stations simultaneously, each slave station comprising means to receive the data and means for determining whether it requires retransmission of the data, wherein at least one slave station is in a first state and the other one or more slave station are in a second state, wherein the at least one slave station in the first state, if retransmission is not required, transmits a positive acknowledgement in a predetermined time slot which is substantially non-overlapping with any positive acknowledgement transmitted by any other slave station in the first state, wherein the other one or more each slave stations in the second state do not transmit a positive acknowledgement if retransmission is not required and transmits a negative acknowledgement if retransmission is required, wherein at least one negative acknowledgement transmitted by at least one slave station in the second state is transmitted at least partially concurrently with at least one said predetermined time slot, and wherein the master station retransmits the data if it does not receive the positive acknowledgement from the other one or more of the slave stations in the first state or if the master station receives at least one negative acknowledgement, and if the validity of the data has not expired, wherein at least one of the plurality of slave stations is commanded into one of the first and second states by the master station, wherein the master station has means for assessing the quality of radio communication with each of the plurality of slave stations, and the at least one slave station in the first state has respectively lower quality radio communication with the master station than the other one or more slave stations in the second state.

2. A system as claimed in claim 1, wherein at least one of the plurality of slave stations comprises means to adjust its transmitted power level under command of the master station.

3. A master radio station for use in a multicast radio network comprising a master station and a plurality of slave stations, the master station comprising means to command at least one of the plurality of slave stations to adopt a first state wherein the slave station in the first state transmits a positive acknowledgement in response to receiving data that the at least one slave stations does not need to have retransmitted, means to command at least one other of the plurality of slave stations to adopt a second state wherein the slave station in the second state does not transmit a positive acknowledgement in response to receiving data that the slave station does not need to have retransmitted and transmits a negative acknowledgement in response to receiving data which the slave station needs to have retransmitted, means to instruct the at least one slave station in the first state of a time slot in which to transmit the positive acknowledgement such that positive acknowledgements transmitted by the slave stations of the first state are transmitted at substantially non-overlapping times, means to transmit data to the plurality of slave stations simultaneously, means to receive acknowledgements from the plurality of slave stations, and means to retransmit the data if the positive acknowledgement is not received from each of the slave stations in the first state or if at least one negative acknowledgement is received, and if the validity of the data has not expired, further comprising means to assess the quality of radio communication with each of the plurality of slave stations and means to select the states of each of the plurality of slave stations such that the quality of communication with the at least one slave station in the first state is lower than the quality of communication with the at least one slave station in the second state.

4. A master radio station as claimed in claim 3, further comprising means to command a slave station to alter its transmitted power level.

* * * * *